United States Patent [19]
Carpenter et al.

[11] Patent Number: 5,603,041
[45] Date of Patent: Feb. 11, 1997

[54] METHOD AND SYSTEM FOR READING FROM A M-BYTE MEMORY UTILIZING A PROCESSOR HAVING A N-BYTE DATA BUS

[75] Inventors: Gary D. Carpenter, Pflugerville; Mark E. Dean, Austin, both of Tex.

[73] Assignee: International Business Machines Corporation, Armonk, N.Y.

[21] Appl. No.: 354,696

[22] Filed: Dec. 13, 1994

[51] Int. Cl.$^6$ ........................................... G06F 13/00
[52] U.S. Cl. ................ 395/800; 395/855; 364/232.8; 364/260.0; 364/DIG. 1
[58] Field of Search ................... 395/800, DIG. 1, 395/200.08, 824, 827, 840, 853–855, 872, 882

[56] References Cited

U.S. PATENT DOCUMENTS

| | | | |
|---|---|---|---|
| 4,999,769 | 3/1991 | Costes et al. | 364/200 |
| 5,162,979 | 11/1992 | Anzelone et al. | 361/415 |
| 5,253,358 | 10/1993 | Thoma, III et al. | 395/500 |
| 5,255,376 | 10/1993 | Frank | 395/325 |
| 5,257,391 | 10/1993 | DuLac et al. | 395/800 |
| 5,265,211 | 11/1993 | Amini et al. | 395/325 |
| 5,291,614 | 3/1994 | Baker et al. | 395/800 |
| 5,313,231 | 5/1994 | Yin et al. | 345/199 |
| 5,313,595 | 5/1994 | Lewis et al. | 395/325 |
| 5,313,648 | 5/1994 | Ehlig et al. | 395/800 |

FOREIGN PATENT DOCUMENTS

| | | | |
|---|---|---|---|
| 0440452A2 | 1/1991 | European Pat. Off. | G06F 13/40 |
| 0470570A2 | 8/1991 | European Pat. Off. | G06F 9/355 |
| 03-198143 | 12/1989 | Japan | G06F 15/16 |

OTHER PUBLICATIONS

M68000, M68000 Family Reference, 1988, pp. 3–116, 3–119.

*Primary Examiner*—Alpesh M. Shah
*Attorney, Agent, or Firm*—Volel Emile; Andrew J. Dillon

[57] ABSTRACT

A method and system are disclosed for reading data from an m-byte memory device utilizing a processor having an n-byte data bus, where m is less than or equal to n, which do not require the processor to support special bus cycles, bus select signals, or dynamic bus sizing. Responsive to an initiating signal from the processor to an interface controller, a plurality of data latches are initialized by a control signal. An address counter is also initialized. The memory device is activated by a control signal. Latching of data by one of the plurality of data latches is enabled. Data associated with an address indicated by the address counter is then latched from the memory device utilizing the enabled data latch. The address counter is incremented. The enabling, latching, and incrementing steps are repeated until n bytes of data are latched. When n bytes of data are latched, the processor is signaled that n bytes of data are valid to read. The processor then reads data from all of the plurality of data latches during a standard read cycle. Thereafter, output from the plurality of data latches is disabled. A burst reading mode is also supported that includes a step, prior to disabling output from the data latches, of responsive to a signal from the processor, repeating the reading step t times in t successive bus cycles, where t is characteristic of a burst transfer size required on initial program load by a cache within the processor.

21 Claims, 5 Drawing Sheets

METHOD AND SYSTEM FOR READING FROM A M-BYTE MEMORY UTILIZING A PROCESSOR HAVING A N-BYTE DATA BUS

BACKGROUND OF THE INVENTION

1. Technical Field

The present invention relates in general to a method and system for improved data transfer and in particular to a method and system for data transfer between a memory device and a processor. Still more particularly, the present invention relates to an improved method and system for reading from a m-byte memory device utilizing a processor having a n-byte data bus, where m is less than or equal to n.

2. Description of the Related Art

A personal computer system is a powerful and cost effective tool for data processing. Prevalent models of personal computers include the IBM PC/AT and the PS/2, both of which are built around either a 80386 or 80486 processor architecture. These personal computer system architectures are collectively designated x86. In order to support a wide variety of data processing functions and structures, x86 processors are often interfaced to devices having a broad range of bit widths, including 8-, 16-, and 32-bit memory devices. Since the cost of memory increases dramatically with increased bit width, it is particularly advantageous for manufacturers of personal computer system to utilize 8-bit memory devices in order to produce products that are price competitive.

The x86 processor architecture supports direct connection between a processor and 8-, 16-, or 32-bit memory devices. However, since an x86 processor has a 32-bit data bus, the processor must determine which bits present on the data bus are valid when the processor is interfaced with an 8- or 16-bit memory. The processor determines which bits on the data bus are valid by a process of dynamic bus sizing in which the processor samples two bus control pins (BS8 and BS16) each bus cycle to determine if a bus transaction is a transfer between the processor and an 8- or 16-bit device. The processor determines whether the transaction involves an 8- or 16-bit device by internally decoding signals BS8 and BS16. When either of the two bus control signals is asserted, the x86 processor must run additional bus cycles if the transaction is a data transfer of a larger number of bytes than the byte width of the memory device. For example, a 486 processor can ordinarily complete a read of a 32-bit value from a 32-bit memory in two bus cycles. However, if the 32-bit value must be read one byte at a time from an 8-bit memory, the read operation would require a minimum of 8 bus cycles.

The dynamic bus sizing feature functions differently in the 386 and 486 processors. When a 386 processor performs a 4-byte read from an 8-bit memory device, for example, the processor reads the 4 bytes on the lowest 8 bits of the data bus (D7-D0) during 4 successive read cycles (a read cycle requires a minimum of 2 bus cycles). In contrast, when a 486 performs a similar read operation, the most significant byte must be driven on data pins D31-D24, the next most significant byte on D23-D16, the third most significant byte on pins D15-D8, and the least significant byte on pins D7-D0. However, like the 386, the 486 processor will perform the 4-byte read in 4 successive read cycles on the bus.

One advance of the 486 over the 386 processor is that the 486 processor is capable of operating in a burst mode. During a burst cycle, data is read or written during every clock cycle rather than every other clock cycle as occurs in non-burst mode. Other than performing a read or write in a single bus cycle, burst mode reads and writes to 8 and 16-bit memories are executed the same as regular read and write operations. One important application of burst mode is to quickly fill the internal cache of the 486 processor.

In response to consumer demand for increased performance in personal computer systems, manufacturers have sought to increase processing speed through streamlining the instruction sets of processors and by developing processors capable of performing multiple instructions during a single clock cycle. The Reduced Instruction Set Computer (RISC) processor is one such device. Despite the enhanced processing performance available with a RISC processor, overall performance remains degraded when reading data from a device interfaced to the processor which has a bit width narrower than the RISC processor bus width.

Consequently, it would be desirable to have a method and system for transferring data between a 64-bit processor, such as the RISC processor, and an 8-bit memory device without requiring the processor to support extra bus cycles or additional internal decodes.

SUMMARY OF THE INVENTION

It is therefore one object of the present invention to provide a method and system for improved data transfer.

It is another object of the present invention to provide an improved method and system for data transfer between a memory device and a processor.

It is yet another object of the present invention to provide an improved method and system for reading from and writing to an m-byte memory device utilizing a processor having an n-byte data bus, where m is less than or equal to n.

The foregoing objects are achieved as is now described. A method and system are disclosed for reading data from an m-byte memory device utilizing a processor having an n-byte data bus, where m is less than or equal to n, which do not require the processor to support special bus cycles, bus select signals, or dynamic bus sizing. Responsive to an initiating signal from the processor to an interface controller, a plurality of data latches are initialized by a control signal. An address counter is also initialized. The memory device is activated by a control signal. Latching of data by one of the plurality of data latches is enabled. Data associated with an address indicated by the address counter is then latched from the memory device utilizing the enabled data latch. The address counter is incremented. The enabling, latching, and incrementing steps are repeated until n bytes of data are latched. When n bytes of data are latched, the processor is signaled that n bytes of data are valid to read. The processor then reads data from all of the plurality of data latches during a standard read cycle. Thereafter, output from the plurality of data latches is disabled. A burst reading mode is also supported that includes a step, prior to disabling output from the data latches, of responsive to a signal from the processor, repeating the reading step t times in t successive standard read cycles, where t is characteristic of a burst transfer size required on initial program load by a cache within the processor.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
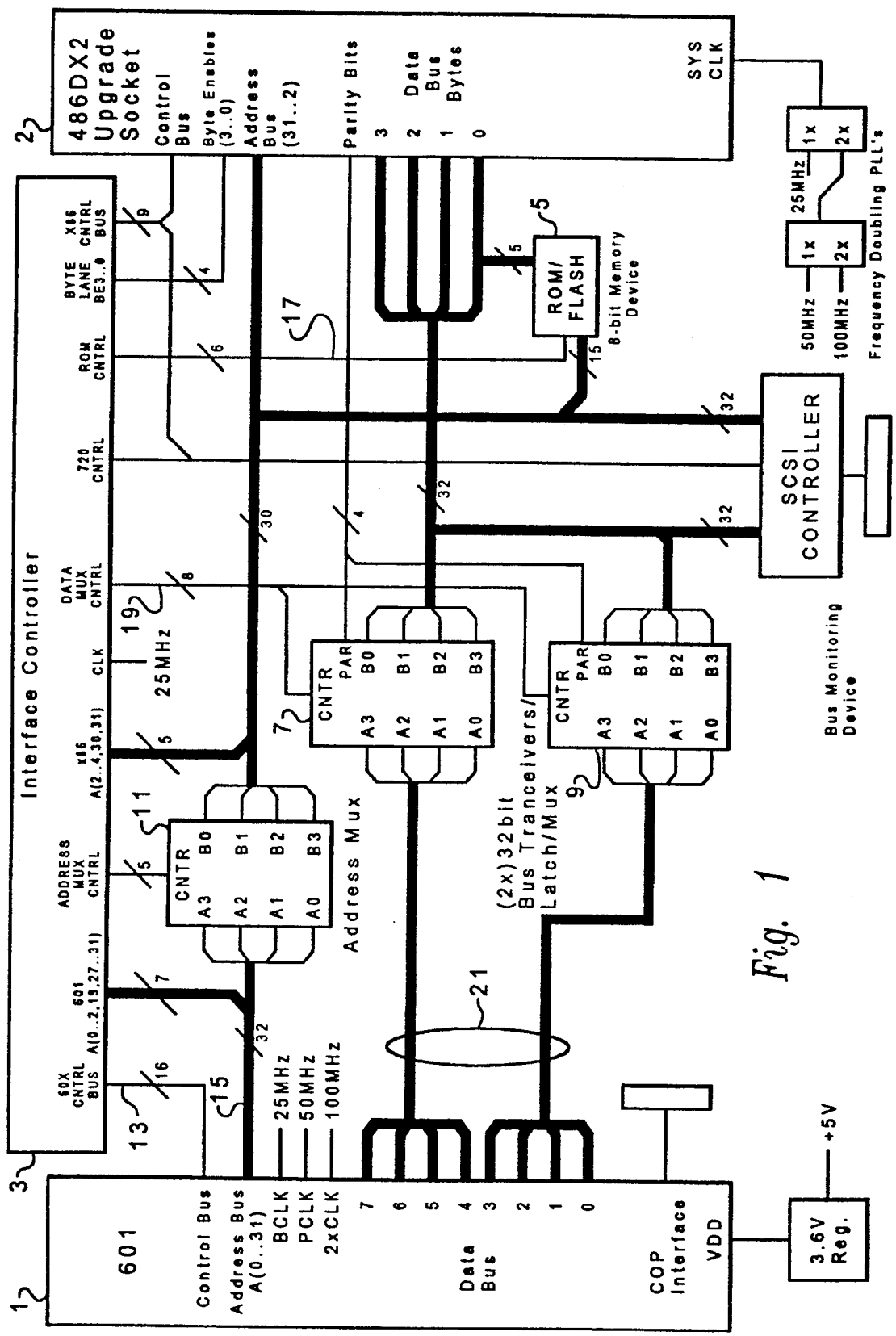
FIG. 1 depicts a block diagram of a circuit utilized to implement the method and system of the present invention.

With reference now to the figures and in particular with reference to FIG. 1, there is illustrated a block diagram of a circuit utilized to interface processor 1, which in a preferred embodiment is a 64-bit PowerPC® 601 RISC processor, to an x86 computer via upgrade socket 2. The circuit comprises interface controller 3, memory 5, address transceiver 11, and data latches 7 and 9.

Interface controller 3, which in a preferred embodiment of the present invention is a electrically erasable programmable logic array (EEPLA) such as the MACH230-15JC available from Advanced Micro Devices, provides the logic means necessary to control the operation of address transceiver 11 and data latches 7 and 9 when programmed utilizing known methods. By utilizing a EEPLA, the control logic of the present invention is realized within a single device, thus minimizing the number of required components. Although the control logic of interface controller 3 may be realized utilizing a single logic device, those skilled in the art will appreciate that in other embodiments of the present invention the control logic could be realized utilizing a combination of suitable logic devices.

Address transceiver 11 and data latches 7 and 9 comprise 32-bit devices which function as transceivers, multiplexers, and latches. Data may be input to or output from either data lines A0-A3 or B0-B3 of address transceiver 11 and data latches 7 and 9. In addition, a selected input data byte may be "steered" to any output data line in response to control signals from interface controller 3. Transceiver 11 and data latches 7 and 9 also function as latches since input data are stored within the devices and may be selectively output in response to control signals from interface controller 3. In the preferred embodiment illustrated in FIG. 1, address transceiver 11 and data latches 7 and 9 are implemented utilizing National Semiconductor 74ACTQ-3283T; however, those skilled in the art will appreciate that a combination of suitable devices could be utilized to perform the described functions.

In a preferred embodiment of the present invention, memory 5 comprises an erasable programmable ROM (EPROM), such as Intel N28F020 or AMD AM27C040. However, as will be recognized by those skilled in the art, other suitable memory devices could be utilized. According to the present invention, the data width of memory 5 is less than that of processor 1. The operation of the circuit metaphor depicted in FIG. 1 according to the present invention will now be described with reference to FIGS. 2–5.

Figure 2:
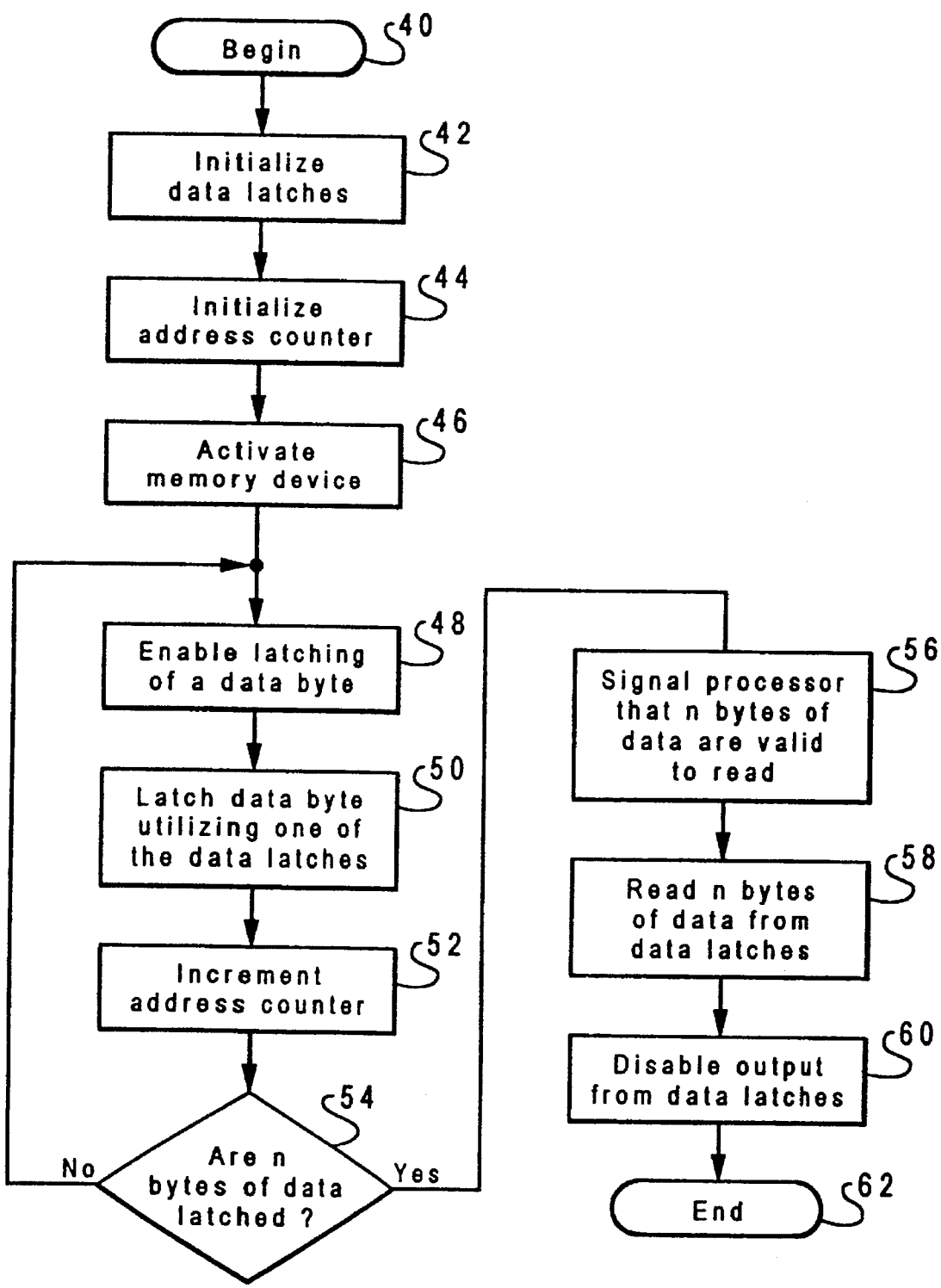
FIG. 2 is a flowchart illustrating a read operation performed according to the method and system of the present invention.
Figure 3:
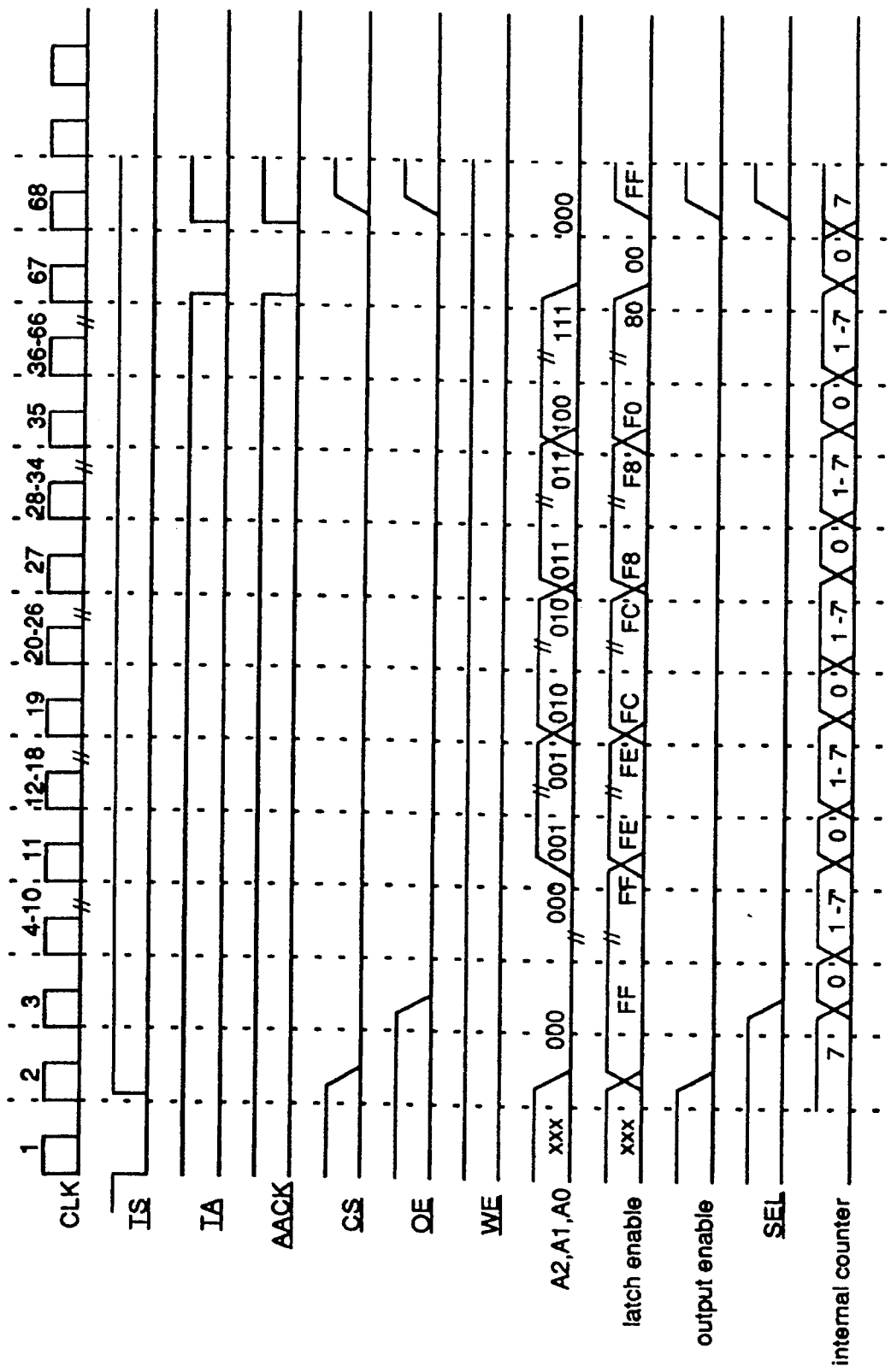
FIG. 3 depicts a timing diagram of the read operation illustrated in FIG. 2.

Referring now to FIGS. 2 and 3, there are depicted a flowchart and timing diagram illustrating a process for utilizing a processor having an n-byte data bus to read data from an m-byte memory device, where n>m, according to the method and system of the present invention. As depicted in FIG. 2, the process begins in block 40 and thereafter proceeds to block 42, which illustrates interface controller 3 initializing data latches 7 and 9 via data control bus 19 in response to processor 1 asserting TS and other bus control signals defining a read operation via control bus 13 and driving an address on address bus 15 within the address range of memory 5. Initializing data latches 7 and 9 includes disabling all latch enables (latch enable=FFh), enabling all output enables to processor 1 (output enable=0), and selecting multiplexing mode (SEL=0) for data latches 7 and 9.

Thereafter, the process proceeds to block 44, which illustrates interface controller 3 initializing an address counter comprised of address bits A2, A1, and A0 within address bus 15. In addition, as depicted in block 46, interface controller 3 activates memory 5 with chip select (CS) and output enable (OE) signals via ROM control bus 17. As indicated in FIG. 3, after activating memory 5 interface controller 3 delays by counting 8 bus cycles utilizing an internal counter. This delay compensates for the slow access time of memory 5. As will be recognized by those skilled in the art, the number of cycles delayed is user defined and will vary with the requirements of the memory utilized in a particular embodiment.

Thereafter, the process proceeds to block 48, which illustrates interface controller 3 enabling the latching of data by a latch within data latches 7 and 9 corresponding to byte lane 0 of data bus 21. Next, the process proceeds to block 50 which depicts latching the data byte at the address indicated by the address counter utilizing the latch enabled in block 48. The process then proceeds to block 52, which illustrates incrementing the address counter comprised of address bits A2, A1, and A0 within address bus 15. The internal counter of interface controller 3 is also reset to 0. Next, block 54 depicts interface controller 3 determining whether n bytes of data have been latched, which in the embodiment illustrated in FIG. 1 is 8 bytes. If 8 bytes of data are not latched by data latches 7 and 9, the process repeats blocks 48, 50, 52, and 54 until 8-bytes of data have been latched. As will be understood by those skilled in the art, the 3-bit address counter comprised of address bits A2-A0 specifies the address of a current byte of data within memory 5, and therefore the number of bytes that have been latched by data latches 7 and 9. In other embodiments of the present invention, the number of address bits utilized as an address counter will vary depending on the data width of processor 1.

When 8-bytes of data have been latched, as depicted by the process proceeding to block 56, interface controller 3 signals processor 1 that 8-bytes of data are valid to read on data bus 21 (TA asserted). Thereafter, the process proceeds to block 58, which illustrates processor 1 reading 8-bytes of data from data latches 7 and 9 via data bus 21. Thus, according to the present invention, processor 1 reads all eight bytes of data from data latches 7 and 9 simultaneously during a standard read cycle on the bus. Next, the process proceeds to block 60, which illustrates interface controller 3 disabling output from data latches 7 and 9 after the read operation of block 58 is complete. The process then terminates in block 62.

Figure 4:
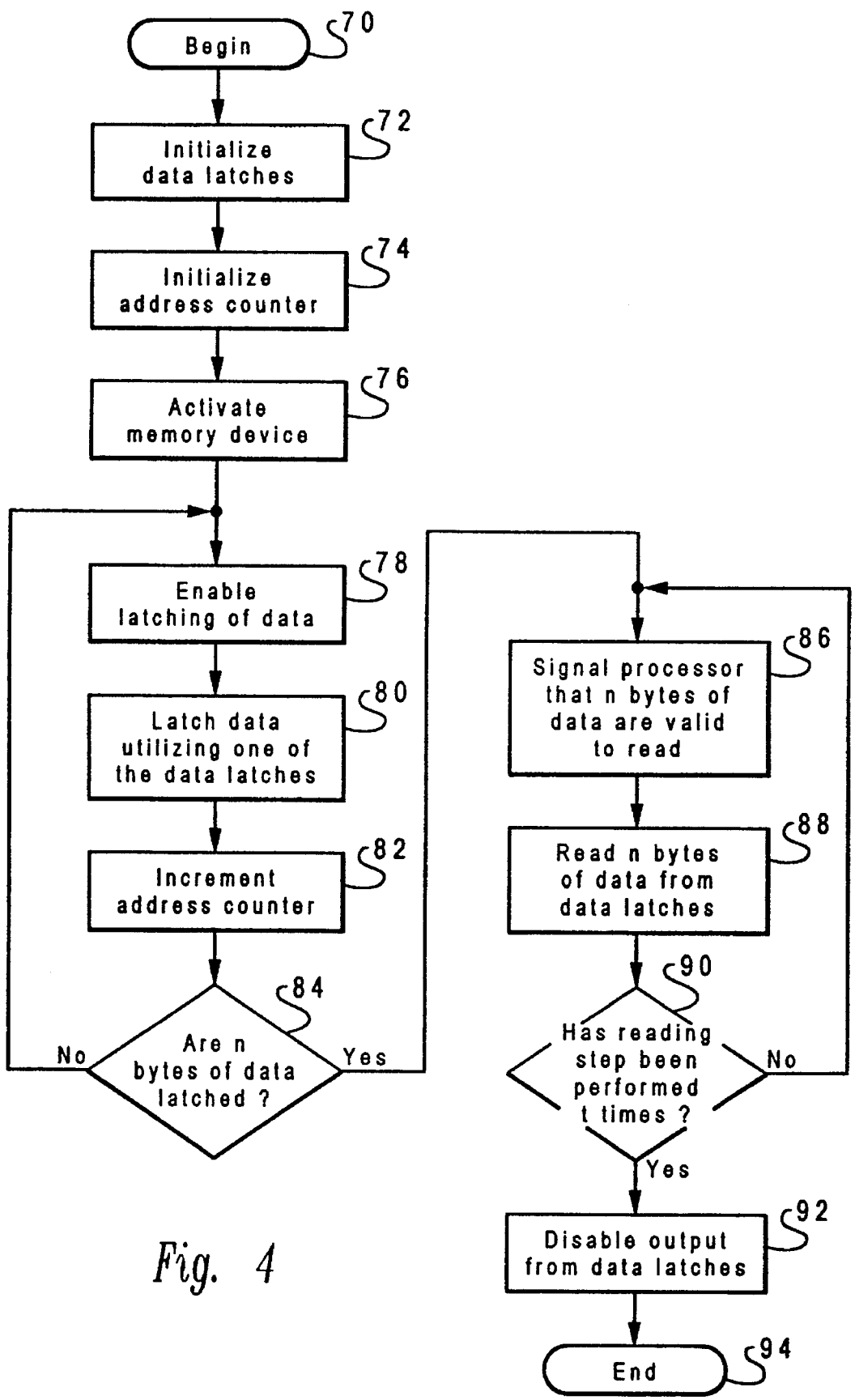
FIG. 4 is a flowchart illustrating a burst mode read operation performed according to the method and system of the present invention.
Figure 5:
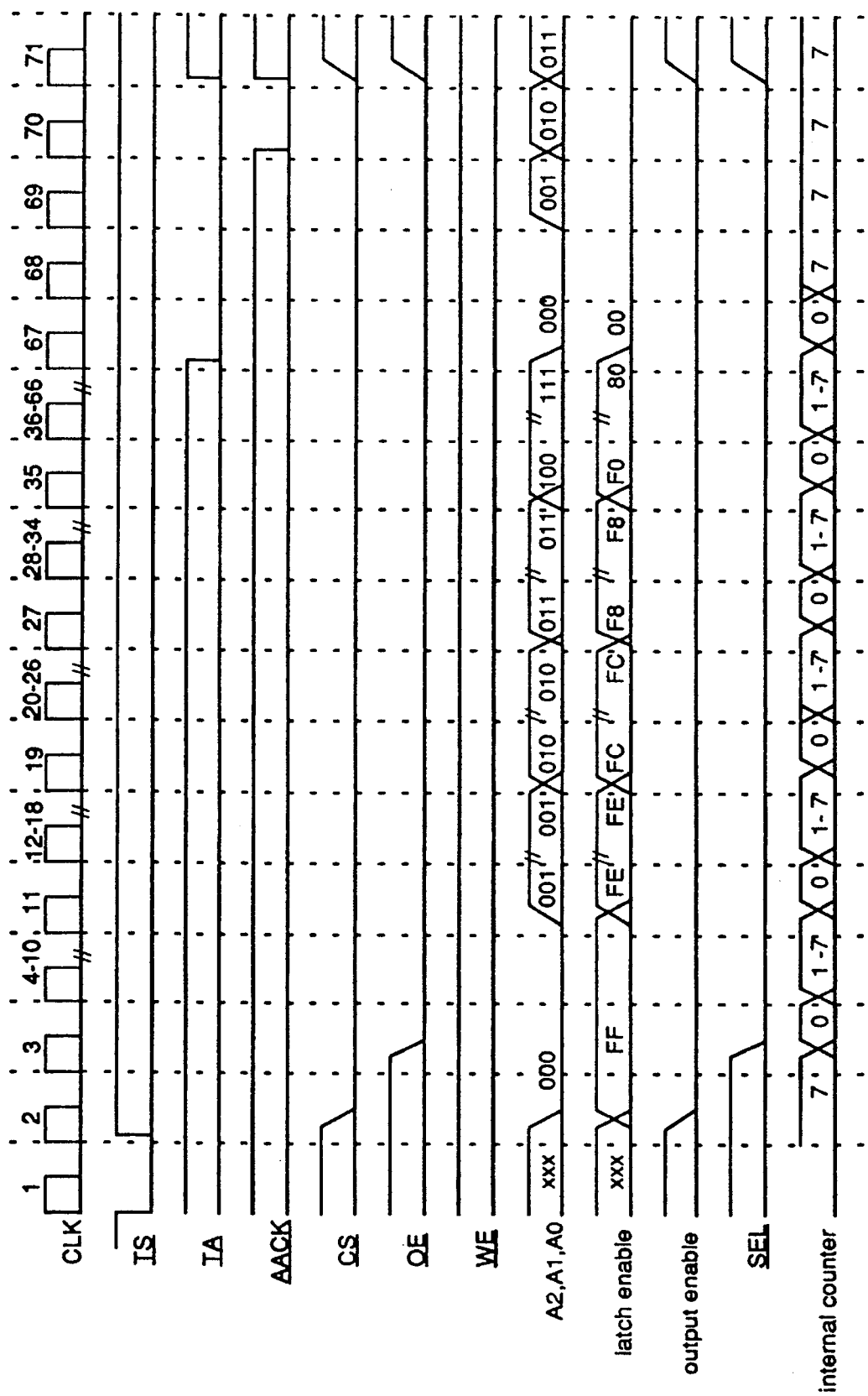
FIG. 5 depicts a timing diagram of the burst mode read operation of FIG. 4.

With reference now to FIGS. 4 and 5, there is illustrated a flowchart of the burst mode read operation performed during instruction fetch cycles after processor reset or initial power-on by the circuit of FIG. 1. In the preferred embodiment illustrated in FIG. 1, processor 1 is a PowerPC® 601 RISC processor containing a 60X bus interface. The PowerPC processor depicted requires a 32-byte cache-line fill operation on initial instruction fetch after a reset or power-on cycle. To fetch the initialization instructions, processor 1 addresses the system's Power-On-Self-Test (POST) code stored in memory 5 interfaced to upgrade socket 2. Like the standard system ROM (not illustrated) that is part of the x86 system board, memory 5 is non-cacheable and interfaces through an 8-bit data path.

As illustrated, the process begins in block 70, in which processor 1 indicates to interface controller 3 that the read operation will be a burst read operation from memory 5 by asserting TBST and other PowerPC 60X bus control signals (not illustrated in FIG. 5). These signals are valid before TS is sampled by interface controller 3. Thereafter, the process proceeds to block 72. Blocks 72–84 represent steps which are performed identically to steps 42–54 of FIG. 2. Likewise, the timing diagram depicted in FIG. 5 parallels the timing diagram illustrated in FIG. 3 during clock (CLK) cycles 1–67.

When n bytes of data have been latched at block 84, the process proceeds to blocks 86–90, which depict processor 1 reading the n bytes held by data latches 7 and 9 t times, where t is the number of n-byte entries contained in a cache-fill cycle (burst read) of processor 1. The same n bytes of data are read from data latches 7 and 9 t times to reduce the time required to satisfy the cache-line fill cycle. In the preferred embodiment depicted in FIG. 1 in which n is 8 and t is 4, the number of cycles required to satisfy the cache-line fill operation from memory 5 is reduced from 4*68=272 to 71 cycles. In the preferred embodiment depicted in FIG. 1, the burst mode read operation defined in FIG. 4 is only utilized during initial instruction fetches following a reset or power-on cycle, in which processor 1 performs cache-line fill operations to fetch initialization instructions until caching operations directed at memory 5 can be disabled.

Returning to FIG. 4, block 86 depicts interface controller 3 signaling processor 1 that n bytes of data are valid to read (TA). In addition as illustrated in FIG. 5, interface controller 3 holds its internal counter in terminal count since processor 1 will read data on each cycle, eliminating the need for interposed delays. Interface controller 3 also activates all latch enables (latch enable=00). Returning to block 88, processor 1 then reads n bytes of data from data latches 7 and 9. After the completion of the read operation illustrated in block 88, the process proceeds to block 90, in which interface controller 3 determines whether the reading operation of block 88 has been performed t times. In the preferred embodiment illustrated in FIG. 1, t equals 4 since data bus 21 is an 8-byte data bus and processor 1 requires 32 bytes in cache-line fill. Interface controller 3 counts the number of 8-byte reads performed by incrementing a counter comprising address lines A0 and A1 each clock cycle. When A1+A2=0, interface controller 3 signals the termination of the burst mode read by transmitting an acknowledgment (AACK) to processor 1 for one cycle. If the reading step of block 88 has not been performed t times, the process repeats blocks 86 and 88. Thereafter, the process proceeds to block 92. Block 92 illustrates interface controller 3 disabling output from data latches 7 and 9. The process then terminates at block 94. Although the burst mode read operation of the present invention has been described with reference to a preferred embodiment in which n equals 8 and t equals 4, those skilled in the art will appreciate that n and t are dependent upon the architecture and instruction requirements of processor 1.

In the preferred embodiment of the present invention depicted in FIG. 1, a special string of instructions is required to support the instruction cache-line fill (burst read) operation after a reset or power-on cycle. Because the processor receives four sets of two instructions (4 bytes per instruction) during the burst read cycles, the instructions received at reset will be executed four times each, in alternating order. Therefore, the instructions must be non-destructive, with the main purpose of disabling the processor's cache as soon as possible. Once the processor's cache is disabled, instructions will be fetched without a burst read operation, allowing for a normal instruction stream for system power-on self-test.

In addition to reading from an 8-bit memory device, the preferred embodiment of the present invention depicted in FIG. 1 also supports 1-byte writes to memory 5, which is a flash memory. A write operation is initiated by applying programming voltage $V_{PP}$, which is typically +12 V or +5 V, to a pin of memory 5. Then, a byte from one of the 8-byte lanes of data bus 21 is routed to memory 5 utilizing one of data latches 7 and 9. Interface controller 3 then enables a write by issuing a control signal to memory 5. After the write operation is completed, interface controller 3 acknowledges completion by signaling processor 1.

Although the present invention has been described with reference to a preferred embodiment in which processor 1 is a PowerPC® 601 RISC processor, those skilled in the art will recognize that other processors having data widths wider than that of the memory may be utilized. Further information concerning the operation of the PowerPC® 601 RISC processor may be found in the *PowerPC® 601 RISC Microprocessor User's Manual*, available from IBM Inc.

While the invention has been particularly shown and described with reference to a preferred embodiment, it will be understood by those skilled in the art that various changes in form and detail may be made therein without departing from the spirit and scope of the invention.

I claim:

1. A method for reading data from an m-byte memory device utilizing an interface coupled between said m-byte memory device and a processor having an n-byte data bus, where m is less than or equal to n, said interface including a plurality of data latches, said method comprising:

initializing an address counter;

latching data from said m-byte memory device utilizing one of said plurality of data latches, said data associated with an address within said m-byte memory device indicated by said address counter;

incrementing said address counter;

repeating said latching and incrementing steps until n bytes of data are simultaneously latched;

signaling said processor that n bytes of data are valid to read; and reading said n bytes of data from all of said plurality of data latches utilizing said processor during a standard read cycle.

2. The method for reading data of claim 1, and further comprising the steps of:

in response to an initiating signal from said processor, initializing said plurality of data latches; and enabling latching of data by one of said plurality of data latches.

3. The method for reading data of claim 1, and further comprising the step of:

subsequent to said step of reading said data, thereafter disabling output from said plurality of data latches.

4. A method for reading instructions from an m-byte memory device utilizing an interface coupled between said m-byte memory device and a processor having an n-byte data bus and a cache for high speed data access, where m is less than or equal to n, said interface including a plurality of data latches, said method comprising:

initializing an address counter;

latching data from said m-byte memory device utilizing one of said plurality of data latches, said data associated with an address within said m-byte memory device indicated by said address counter;

incrementing said address counter;

repeating said latching and incrementing steps until n bytes of data are simultaneously latched;

signaling said processor that n bytes of data are valid to read; and reading said n bytes of data from all of said plurality of data latches t times in t successive standard read cycles utilizing said processor, wherein t is characteristic of a burst transfer size required by said cache on initial program load.

5. The method for reading instructions of claim 4, and further comprising the steps of:

in response to an initiating signal from said processor, initializing said plurality of data latches; and enabling latching of data by one of said plurality of data latches.

6. The method for reading instructions of claim 4, and further comprising the step of:

subsequent to said step of reading said data, thereafter disabling output from said plurality of data latches.

7. A system for reading data from an m-byte memory device utilizing a processor having an n-byte data bus, where m is less than or equal to n, said system comprising:

a plurality of data latches coupled between said m-byte memory device and said n-byte data bus of said processor;

means for initializing an address counter;

means for latching data from said m-byte memory device utilizing one of said plurality of data latches, said data associated with an address within said m-byte memory device indicated by said address counter;

means for incrementing said address counter;

means for latching data from said m-byte memory device and incrementing said address counter until n bytes of data are simultaneously latched;

means for signaling said processor that n bytes of data are valid to read; and means for reading said n bytes of data from all of said plurality of data latches utilizing said processor during a standard read cycle.

8. The system for reading data of claim 7, wherein said m-byte memory device is ROM.

9. The system for reading data of claim 7, where m is 1.

10. The system for reading data of claim 7, where n is 8.

11. A system for reading instructions from an m-byte memory device utilizing a processor having an n-byte data bus and a cache for high speed data access, where m is less than or equal to n, said system comprising:

a plurality of data latches coupled between said m-byte memory device and said n-byte data bus of said processor;

means for initializing an address counter;

means for latching data from said m-byte memory device utilizing one of a plurality of data latches, said data associated with an address within said m-byte memory device indicated by said address counter;

means for incrementing said address counter;

means for latching data from said m-byte memory device and incrementing said address counter until n bytes of data are latched;

means for signaling said processor that n bytes of data are valid to read; and means for reading said n bytes of data from all of said plurality of data latches t times in t successive standard read cycles utilizing said processor, wherein t is characteristic of an burst transfer size required by said cache on initial program load.

12. The system for reading instructions of claim 11, wherein said m-byte memory device is ROM.

13. The system for reading instructions of claim 11, where m is 1.

14. The system for reading instructions of claim 11, where n is 8.

15. The system for reading instructions of claim 11, where t is 4.

16. A method for reading data from an m-byte memory device utilizing a processor having an n-byte data bus, where m is less than or equal to n, said method comprising:

in response to an initiating signal from said processor to an interface controller, initializing a plurality of data latches by transmitting a control signal from said interface controller;

initializing an address counter;

activating said memory device with a control signal from said interface controller;

enabling latching of data by one of said plurality of data latches;

latching data from said memory device utilizing one of said plurality of data latches, said data associated with an address within said memory device indicated by said address counter;

incrementing said address counter;

repeating said enabling, latching, and incrementing steps until n bytes of data are latched;

signaling said processor that n bytes of data are valid to read;

reading said data from all of said plurality of data latches utilizing said processor during a standard read cycle; and thereafter disabling output from said plurality of data latches.

17. A method for reading instructions from an m-byte memory device utilizing a processor having an n-byte data bus and a cache for high speed data access, where m is less than or equal to n, said method comprising:

in response to an initiating signal from said processor to an interface controller, initializing a plurality of data latches by transmitting a control signal from said interface controller;

initializing an address counter;

activating said memory device with a control signal from said interface controller;

enabling latching of data by one of said plurality of data latches;

latching data from said memory device utilizing one of said plurality of data latches, said data associated with an address within said memory device indicated by said address counter;

incrementing said address counter;

repeating said enabling, latching, and incrementing steps until n bytes of data are latched;

signaling said processor that n bytes of data are valid to read; reading said data from all of said plurality of data latches t times in t successive standard read cycles utilizing said processor, wherein t is characteristic of an burst transfer size required by said cache on initial program load; and thereafter disabling output from said plurality of data latches.

18. A system for reading data from an m-byte memory device utilizing a processor having an n-byte data bus, where m is less than or equal to n, without requiring said processor to support special bus cycles, bus select signals, or dynamic instruction sizing, said system comprising:

means, responsive to an initiating signal from said processor to an interface controller, for initializing a plurality of data latches by transmitting a control signal from said interface controller;

means for initializing an address counter;

means for activating said memory device with a control signal from said interface controller;

means for enabling latching of data by one of said plurality of data latches;

means for latching data from said memory device utilizing one of said plurality of data latches, said data associated with an address within said memory device indicated by said address counter;

means for incrementing said address counter;

means for repeating said enabling, latching, and incrementing steps until n bytes of data are latched;

means for signaling said processor that n bytes of data are valid to read; and means for reading said data from all of said plurality of data latches utilizing said processor during a standard read cycle.

19. The system for reading data of claim 18, wherein said interface controller is an electrically-erasable programmable logic array (EEPLA).

20. A system for reading instructions from an m-byte memory device utilizing a processor having an n-byte data bus and a cache for high speed data access, where m is less than or equal to n, said system comprising:

means, responsive to an initiating signal from said processor to an interface controller, for initializing a plurality of data latches by transmitting a control signal from said interface controller;

means for initializing an address counter;

means for activating said memory device with a control signal from said interface controller;

means for enabling latching of data by one of said plurality of data latches;

means for latching data from said memory device utilizing one of said plurality of data latches, said data associated with an address within said memory device indicated by said address counter;

means for incrementing said address counter;

means for repeating said enabling, latching, and incrementing steps until n bytes of data are latched;

means for signaling said processor that n bytes of data are valid to read; and means for reading said data from all of said plurality of data latches t times in t successive standard read cycles utilizing said processor, wherein t is characteristic of a burst transfer size required by said cache on initial program load.

21. The system for reading instructions of claim 20, wherein said interface controller is an electrically-erasable programmable logic array (EEPLA).

* * * * *